United States Patent [19]

Yoshioka et al.

[11] Patent Number: 5,515,519
[45] Date of Patent: May 7, 1996

[54] DATA PROCESSOR AND METHOD UTILIZING CODED NO-OPERATION INSTRUCTIONS

[75] Inventors: Shinichi Yoshioka, Kodaira, Japan; Fumio Arakawa, Menlo Park, Calif.; Hiroshi Yajima, Tokyo; Yugo Kashiwagi, Tokorozawa, both of Japan

[73] Assignee: Hitachi, Ltd., Tokyo, Japan

[21] Appl. No.: 207,785

[22] Filed: Mar. 7, 1994

[30]    Foreign Application Priority Data

Mar. 19, 1993  [JP]  Japan .................................. 5-085508

[51] Int. Cl.⁶ ...................................................... G06F 9/32
[52] U.S. Cl. ...................... 395/375; 364/DIG. 1; 364/261.5; 364/262.7
[58] Field of Search ................................ 395/375, 400, 395/700; 364/DIG. 1 MS File, DIG. 2 MS File

[56]    References Cited

U.S. PATENT DOCUMENTS 4,701,842  10/1987  Olnowich .................. 364/DIG. 1
4,937,783   6/1990  Lee ........................... 364/DIG. 2
5,121,498   6/1992  Gilbert et al. ............. 364/DIG. 2
5,396,622   3/1995  Lee et al. ................... 395/700 X

FOREIGN PATENT DOCUMENTS 3135630   6/1991  Japan .
3282734  12/1991  Japan .

Primary Examiner—Thomas M. Heckler
Attorney, Agent, or Firm—Alan R. Loudermilk

[57]    ABSTRACT

A compiler incorporates obtained information for controlling the data-processor hardware, such as the position of the branch destination of a branch instruction and the used states of registers into object codes (NOP instruction) including a no-operation instruction code to post it to the data processor. The data processor is so constituted as to effectively use the data-processor resource not practically used by the no-operation instruction code and reflect the hardware control information included in the object code on data processing.

15 Claims, 9 Drawing Sheets

EXAMPLE OF PROCESSING BY COMPILER IN GENERATING CODE

FIG. 2

BRANCH TABLE GENERATED IN GENERATING CODE — 10

| BRANCHING INSTRUCTION | BRANCHING INSTRUCTION ADDRESS | BRANCH DESTINATION ADDRESS |
|---|---|---|
| BRA | B1 | T1 |
| BCC | B2 | T2 |
| BSR | B3 | T3 |
| ...... | ...... | ...... |

LOOP TABLE — 11

| ADDRESS | LOOP |
|---|---|
| L1 | 0 |
| L2 | 0 |
| L3 | 1 |
| L4 | 1 |
| ...... | ...... |

FIG. 3

REGISTER ALLOCATION TABLE — 13

| INSTRUC-TION LABEL | REGISTER | | | | |
|---|---|---|---|---|---|
| | R0 | R1 | R2 | R3 | ... |
| L1 | VARIABLE A | | | | |
| L2 | VARIABLE A | VARIABLE A | | | |
| L3 | VARIABLE A | VARIABLE A | | | |
| L4 | | | VARIABLE B | VARIABLE B | |
| L5 | | | | | |
| ...... | | | | | |

EXAMPLE OF NOP INSTRUCTION

| FUNCTION OF NOP | BIT 14 | BIT 15 | OFFSET |
|---|---|---|---|
| ONLY NOP | 0 | 0 | NUMBER OF NO-OPERATION CYCLES |
| BRANCH POSTING | 1 | 0 | BRANCH DESTINATION ADDRESS OF NEXT BRANCH INSTRUCTION (PC RELATIVITY) |
| REGISTER ALLOCATION POST | 1 | 1 | SUBROUTINE RETURN-ADDRESS STORING REGISTER NUMBER |
| LOOP POSTING | 0 | 1 | *** 1 : OUTSIDE OF LOOP,<br>*** 0 : INSIDE OF LOOP |

FIG. 6 PROCESSING FLOW

FIG. 8

EFFECT OF BTAR

- RELATIVE ADDRESS (1) OF BRANCH DESTINATION ADDRESS (L1) OF BCC OF (2) IS INCORPORATED INTO NOP INSTRUCTION OF (1) (WHEN GENERATING CODE).
- (2) IS THE FIRST BRANCH INSTRUCTION AFTER (1).
- ADDRESS IS CALCULATED AND SET IN BRANCH DESTINATION ADDRESS REGISTER (BTAR). BRANCH DESTINATION ADDRESS REGISTER VALID FLAG (BTARV) IS SET {WHEN EXECUTING NOP OF (1)}.
- WHEN BRANCH CONDITIONS ARE MET AND BTARV IS SET, BRANCH DESTINATION ADDRESS IS READ FROM BTAR (ID STAGE OF BCC OF (2)), AFTER IT IS READ, BTARV IS RESET. WHEN CONDITIONS ARE MET, BTARV IS ALSO RESET.

```
       CMP
       BCC  L0
 (1)   NOP
       ---------
       CMP
 (2)   BCC  L1
       L0   ADD
       ---------
       L1   SUB
```

(A) WHEN BTAR IS NOT USED, BRANCH DESTINATION ADDRESS IS CALCULATED AT EX STAGE OF (2). BCC IS EXECUTED IN 3 CLKS.

| CMP | IF | ID | EX | OA | OS |    |    |    |
|-----|----|----|----|----|----|----|----|----|
| (2) BCC |  | IF | ID | EX | OA | OS |  |  |
| L1 SUB |  |  |  |  | IF | ID | EX | OA | OS |

(B) WHEN BTAR IS USED, BRANCH DESTINATION ADDRESS IS CALCULATED IN (1) AND READ IN ID STAGE OF (2). BCC IS EXECUTED IN 2 CLKS.

| NOP | IF | ID | EX |    |    |    |    |    |
| CMP |    | IF | ID | EX | OA | OS |    |    |
| (2) BCC |  |  | IF | ID | EX | OA | OS |  |
| L1 SUB |  |  |  | IF | ID | EX | OA | OS |

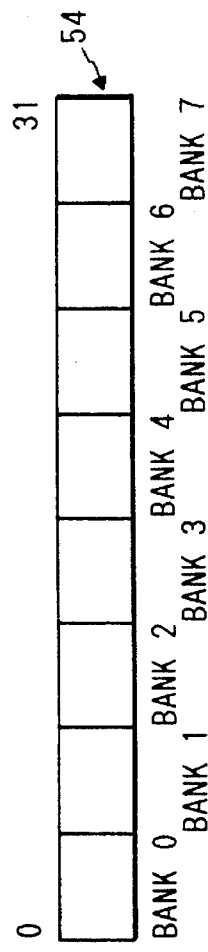
FIG. 9
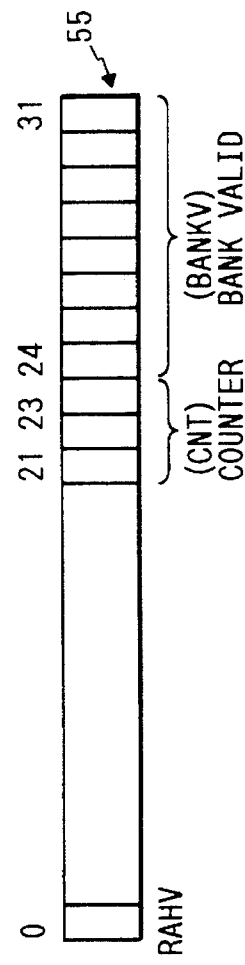
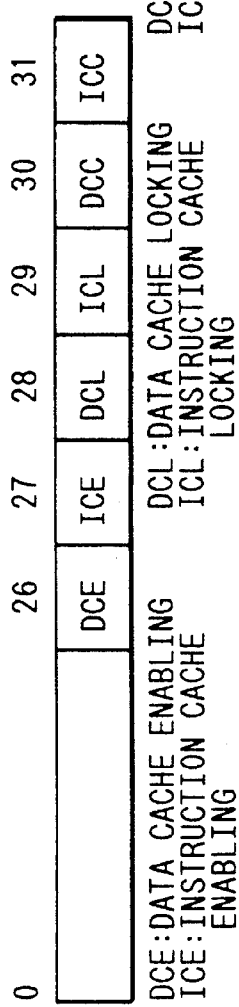
FIG. 12

RTS INSTRUCTION PROCESSING FLOW

BSR INSTRUCTION PROCESSING FLOW

DATA PROCESSOR AND METHOD UTILIZING CODED NO-OPERATION INSTRUCTIONS

BACKGROUND OF THE INVENTION

The present invention relates to a compiler for generating object code by compiling a source program expressed in a high-level language and to a data processor for executing an object program generated by the compiler, particularly to a technique to be effectively applied to a computer corresponding to, for example, a RISC (Reduced Instruction Set Computer) architecture and a compiler for such as architecture.

In a compiler for generating object codes by compiling a source program, information depending on the hardware such as the register constitution of a data processor (target machine), which is the object of the compiler is interpreted and register allocation of variables and rearrangement of instructions are performed in a code generation step which is the final stage. In this step, a branch table, a loop table, and a register allocation table are generated. Such information can be placed as the control information depending on the hardware of the subject data processor and obtained by the compiler in its processing step.

In this case, the processing speed of a data processor such as a microcomputer is increased by using techniques such as pipeline processing and cache memories. Correspondingly, a compiler may be designed to perform various optimization processes for improving the efficiency of execution of an object in conformity with the hardware of the object data processor. For example, as disclosed in Japanese Patent Laid-Open Nos. 135630/1991 and 282734/1991, compilers are disclosed which perform scheduling of instructions by considering the pipeline processing of the data processor or hardware such as cache memories and inserting a no-operation instruction into an instruction code string for code optimization and instruction scheduling. Therefore, when the compiler intends to generate an object code with a high execution efficiency in conformity with the hardware of an object data processor having advanced functions, the compiler has to receive various pieces of information adapted to the hardwares of the object data processor and make the most of them.

SUMMARY OF THE INVENTION

Heretofore, however, when various pieces of information adapted to the hardware of an object data processor are given to a compiler, useful control information obtained in the compiling step and depending on the hardware of the object data processor, such as a branch table, a loop table, and a register allocation table is used only by the compiler but it is not given to the data processor in the form of object code. It has been clarified by the inventor of the present invention that a data processor involves problems of pipeline hazards such as branch processing and resource competition and a problem such as restriction on the capacity of cache-memory which can be built in, and information useful for solving these problems is present in the compiler side in the entire processing flow grasped by the compiler in conformity with the hardware of the data processor.

Moreover, the inventor of the present invention has studied the way how such new control information may be posted to the data processor. For example, though necessary information can be transferred by a new exclusive instruction added to post the information, the number of instruction execution cycles for posting the information increases. Therefore, the inventor of the present invention has thought of making use of a no operation instruction arranged for instruction scheduling and optimization throughout an instruction string, and found the usefulness of effectively using the data-processor resource while the data processor is doing no processing by the no operation instruction, to cause the data processor perform processes necessary for transferring desired information.

It is an object of the present invention to provide a compiler and a data processor for realizing a compiler that transfers information grasped by the compiler to the data processor in the form of object code in which the information is taken and the data processor executes instructions using the information, to increase the data processing speed.

The above object and other objects and new features of the present invention will become more apparent from the description and accompanying drawings of the specification.

The following is a brief description of the outline of a typical invention among those disclosed in this application.

That is, a compiler incorporates obtained information for controlling the hardware of a data-processor, such as the position of the branching destination of a branch instruction and the used states of the registers, into object code (NOP instruction) including a no-operation instruction code to post it to the data processor. The data processor is so constituted as to effectively use the data processor resource not substantially used by the no-operation instruction and to permit the hardware control information included in the object code to be used in data processing.

Functions to be newly added to the NOP instruction are a function of specifying the number of no-operation cycles, a function of posting the branch specifying address of the next branch instruction, a function of allocating registers for storing subroutine return addresses, and a function of posting an instruction loop.

The data processor comprises decoding means for decoding an object code including the no-operation instruction code generated by the compiler and executing means for executing the object code in accordance with the result of decoding the object code.

Using the above means, generation of an object program incorporating the hardware control information peculiar to an object data processor makes it possible to generate an object program with improved performance. Incorporating hardware control information into object code including a no-operation instruction code makes it possible to effectively use the data-processor resource not substantially used by the no-operation instruction code, further increasing the data processing speed.

For example, the function of posting the number of no-operation cycles simplifies the dealing with the architecture of a super pipeline with decreased pipeline pitches.

The function of posting a branch destination address of the next branch instruction makes it possible to fetch the instruction from the branch destination without wasting the time to obtain the operation result of the branch destination address of the branch instruction.

The function of the allocation of registers makes it possible to use the registers to store the return address instead of the use of the stack area developed on a memory and omit relatively-slow memory access in obtaining the return address for return. This contributes to improvement of the processing speed.

The function of posting an instruction loop makes it possible to control the inhibition of exchange of entries into an instruction cache memory for holding instructions in a loop, to effectively use a built-in cache with a limited storage capacity, and decrease the frequency of accesses to an external memory, which takes a long time to access. Therefore, this contributes to improvement of the data processing speed.

BRIEF DESCRIPTION OF THE DRAWINGS

FIG. 2 is a diagram for illustrating examples of a branch table and a loop table generated by a compiler in generating code;

FIG. 3 is a diagram for illustrating an example of a register allocation table generated by a compiler in generating code;

FIG. 8 is a diagram for illustrating concrete actions using a NOP instruction having a branch posting function;

FIG. 9 is a diagram for illustrating examples of a return address hold register word and a return address hold control register;

FIG. 12 is a diagram for illustrating a cache control register.

DESCRIPTION OF THE PREFERRED EMBODIMENTS

[1] High-level language compiler

Figure 1:
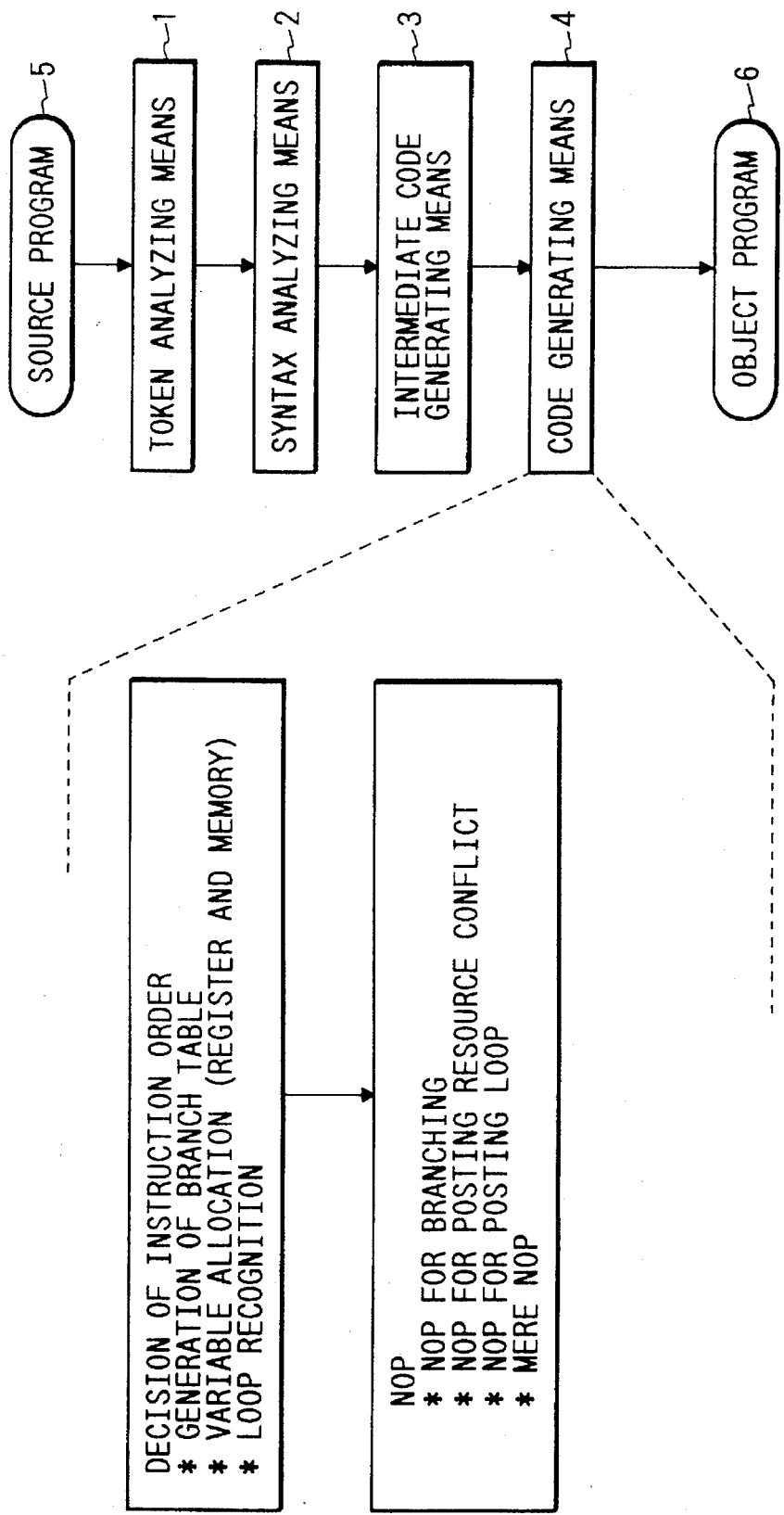
FIG. 1 is a diagram for illustrating the logical constitution of a high-level language compiler of an embodiment of the present invention and a processing by the compiler when inserting a NOP instruction.

FIG. 1 shows a logical constitution of the high-level language compiler of an embodiment of the present invention. The compiler shown in FIG. 1, though not limited, includes token analyzing means 1, syntax analyzing means 2, intermediate code generating means 3, and code generating means 4, and compiles a source program 5 expressed in a high-level language such as C language into an object program 6.

The token analyzing means 1 receives the source program 5 to analyze its language. That is, the means 1 constitutes the source program 5 into the minimum unit having meaning as a language (the unit is called a word or token). The words includes a constant, label, reserved word, operator, and delimiter. The syntax analyzing means 2 receives a source program converted into token strings to analyze the compatibility with the syntax. The intermediate code generating means 3 recognizes various statements, blocks, and procedures which are components of the source program 5 to convert them into intermediate codes which are intermediate word expressions. The code generating means 4 converts the intermediate codes into object code. That is, it allocates variables to registers according to the hardware constitution of a target machine (object data processor for executing an object program) to generate the object program 6.

In the code generating means 4 of the final stage, information depending on the hardware such as the register constitution of the object data processor is interpreted, and allocation of variables to registers and rearrangement of instructions are performed. In this case, the branch table 10 and loop table 11 shown in FIG. 2 and the register allocation table 13 shown in FIG. 3 are generated. The branch table 10 comprises branch instructions, labels of the addresses of the branch instructions, and labels of branch destination addresses. The register allocation table 13 comprises instruction address labels and states of allocation of variables corresponding to the labels. The loop table 11 is a table for showing whether or not an instruction is present in a loop structure and comprises instruction address labels and flags for indicating whether or not the label is present in the loop structure.

A compiler optimizes an object program by the code generating means 4 through rearrangement of instruction strings. For example, the compiler inserts adequate instructions before and after a branch instruction into a delay slot of a delay branch in order to increase the execution speed of the branch instruction. Unless there is an adequate instruction to insert, it inserts an instruction including a no-operation instruction code (hereafter referred to as a NOP instruction). That is, in a computer having a RISC architecture, the position of an instruction to be executed immediately after the branch instruction is assumed as a delay slot and an instruction set in the delay slot is executed before the branching in order to decrease the disorder of the pipeline in branching. If NOP instructions of no operation are set in all delay slots, no-operation NOP-instruction cycle is inserted wherever branching occurs. This is inappropriate in view of the execution speed. Therefore, when there is an appropriate instruction which does not cause any trouble even if it is inserted into the delay slot, the instruction is inserted into the delay slot to rearrange and to perform optimization. Also in the case of a data processor having a plurality of pipelines such as the latest superscaler architecture, the compiler inserts a no-operation NOP instruction into an adequate position of an instruction string.

[2] Incorporation of control information into a NOP instruction

The contents of a compiler up to this stage are the same as conventional ones. In this embodiment, the data-processor hardware control information obtained in generating a code is incorporated into a no-operation NOP instruction frequently used in an object program during the above optimization processing so that the information can be posted to the data processor.

FIG. 1 shows the processing by the compiler when inserting an NOP instruction. At the stage of generating codes, the branch table 10, register allocation table 13, and loop table 11 are already generated. The compiler is able to grasp how the processing to be realized by an object program progresses by referring to the information in the tables and incorporates the hardware control information into the NOP instruction. The NOP instruction into which the control information is incorporated includes, though not limited, to, four NOPs such as a branching NOP, a resource conflict posting NOP, loop posting NOP, and a mere NOP. When the compiler inserts the NOP instruction with reference to the information in the tables, it selects one of the NOP instructions and issues each NOP instruction.

Figure 4:
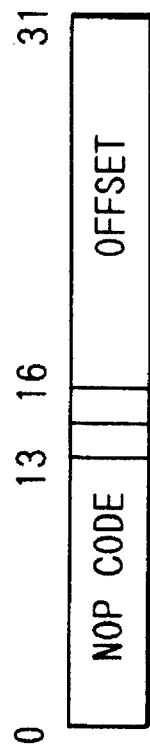
FIG. 4 is a diagram for illustrating the instruction format and function of a NOP instruction having four functions.

FIG. 4 shows a NOP instruction having the above four functions. Though not limited, a NOP instruction comprises 32 bits and is no-operation similarly to a conventional no-operation NOP instruction in view of software operation, but has a field for posting compiler information to a data processor. That is, bits 0 to 13 are used as the field for specifying a no-operation instruction code (NOP code) similarly to a conventional one and indicating that this instruction is a no-operation NOP instruction. And, bits 14 and 15 are used as a specifying field for representing the above functions and bits 16 to 31 are used as an offset field.

(1) When the bits 14 and 15 are 0 and 0, respectively, the instruction is a normal no-operation NOP. The bits 16 to 31 represent how many cycles the NOP has. This is for dealing with the architecture of a superpipeline with small pipeline pitches.

(2) When the bits 14 and 15 are 1 and 0 respectively, the instruction is of the function of posting the branching. After the NOP instruction of posting the branching is executed, the address of a branch destination of a branch instruction which first appears is incorporated into an offset in the form of a relative address from the address of the NOP instruction. At this time, the compiler uses the branch table 10. This function allows the data processor to fetch the instruction at the branch destination without wasting time to obtain the operation result of the branch destination address of the branch instruction.

(3) When the bits 14 and 15 are 1 and 1, respectively, the instruction is of the function of posting a usable register. After this NOP instruction is executed, the number of the register usable for storing the return address is incorporated into an offset returning to the state of execution of a subroutine branch instruction which first appears (hereafter referred to as BSR instruction). In this case, the compiler uses the register allocation table 13. Because this function allows the data processor to use a register to store the return address instead of the stack region developed on a memory, it is possible to omit the relatively-slow access to the memory in obtaining the return address for return. This contributes to improvement of the processing speed.

(4) When the bits 14 and 15 are 0 and 1, respectively, the instruction is of the function of posting a loop. It is shown by an offset whether or not this NOP instruction is present in a loop structure. The indication on whether or not the NOP instruction is present in the loop structure is used to control exchange inhibition of entries in an instruction cache memory. Thereby, after the instruction of the loop part is fetched into the cache, it is possible to inhibit the instruction of the loop part from being purged out of the instruction cache by fetching the parts other than the loop part and decrease the number of times of accesses to an external memory, which takes a long time to access. This contributes to improvement of the data processing speed.

[3] Data processor

The following is the description of a data processor serving as a target machine most suitable to use a NOP instruction into which the above functions are incorporated.

Figure 5:
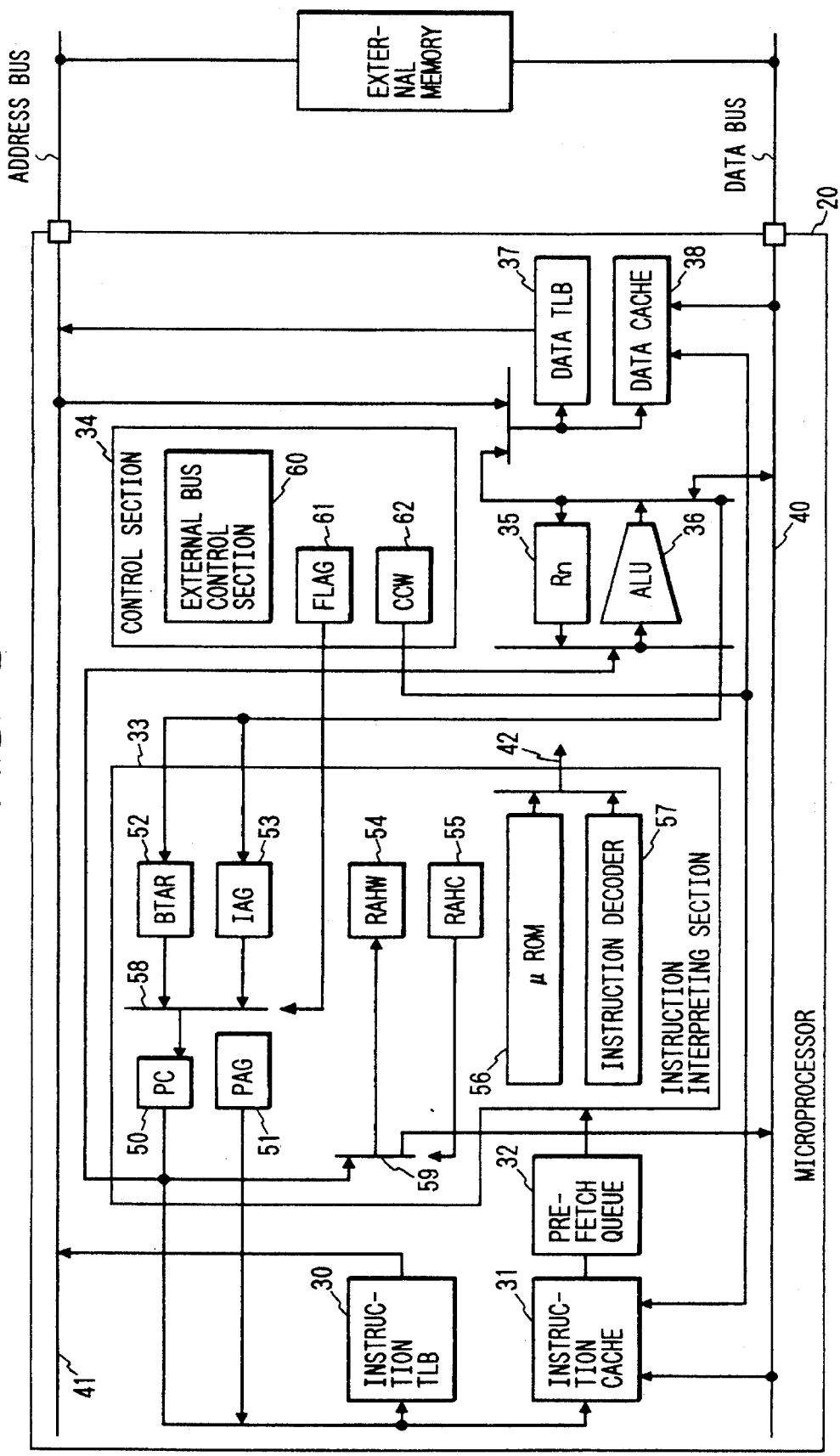
FIG. 5 is a block diagram of a microprocessor which is an embodiment of the data processor of the present invention.

FIG. 5 shows a block diagram of a microprocessor which is an embodiment of the data processor of the present invention. In the microprocessor 20 shown in FIG. 5, a program counter (PC) 50 of an instruction interpreting section 33 holds an instruction address to be next executed. The instruction cache 31 is searched by an instruction prefetch address outputted from a prefetch address generation circuit (PAG) 51, and an instruction to be executed by the microprocessor 20 is read out of an instruction cache 31 in the case of cache hit. In the case of cache miss, the prefetch address is translated into a physical address by an instruction address translating buffer (instruction TLB) 30 and output to an address bus 41 and the instruction is prefetched from an external memory receiving the physical address through a data bus 40. The instruction is buffered by a prefetch queue 32 and sent to the instruction interpreting section 33. The instruction interpreting section 33 interprets the instruction in an instruction decoder 57 and sequentially reads a sequence of microinstructions corresponding to the instruction out of a μROM 56 to generate control information 42 necessary for execution of the instruction. A general-purpose register 35 and an arithmetic and logic unit (ALU) 36 are controlled by the control information 42 and thereby the instruction is executed. The general-purpose register 35 comprises a plurality of registers and stores the results of the operation by the arithmetic and logic unit (ALU) 36. Data necessary for instruction execution or the like is input/output through a data cache 38 and data address translating buffer (data TLB) 37. External bus control necessary at this time is performed by an external bus control section 60 in a control section 34. The control section 34 has, other than the external bus control section 60, various flags 61 and a cache control register (CCW) 62. Though a program comprising a plurality of instructions is stored in an external memory, part of them are stored in the instruction cache 31.

Figure 6:
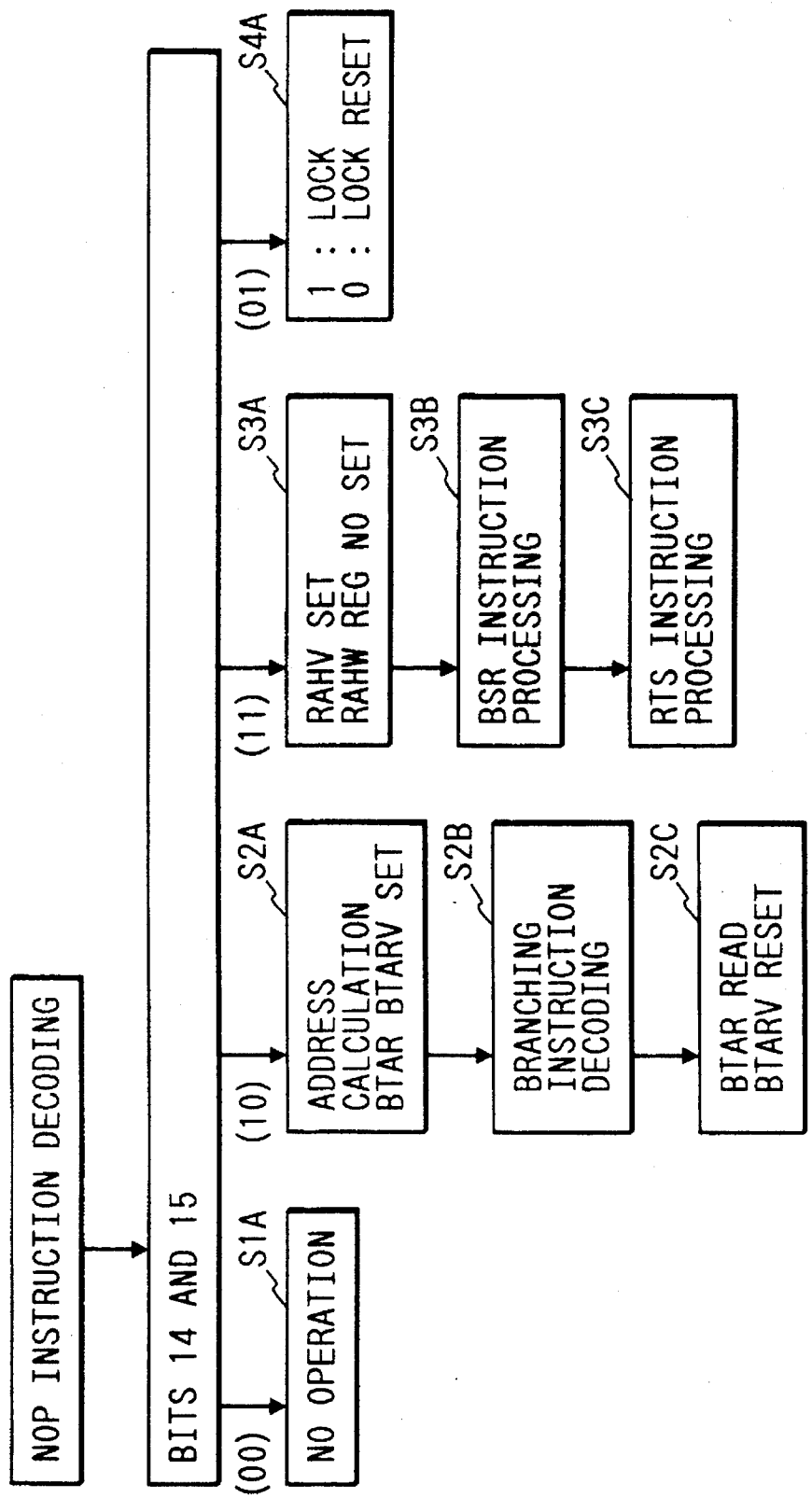
FIG. 6 is a diagram for illustrating the processing procedure for each of four NOP instructions.

Four functions of the above NOP instructions, though not limited, are recognized by the decoding of the instructions by the instruction decoder 57. The entire processing flow at this time is shown in FIG. 6. The constitution and control procedure for realizing each function will be successively described below, referring to FIG. 6.

[4] Means for realizing function of only NOP

For the function of "only NOP" shown in FIG. 4, it is necessary to repeat no-operation by the number of cycles specified by an instruction offset field (Step S1A in FIG. 6). That is, it is necessary for the instruction interpreting section 33 to have a decoding logic corresponding to it or a control logic of a microprogram. This is realized by the instruction decoder 57 or the μROM 56.

[5] Means for realizing function of branch posting

Figure 7:
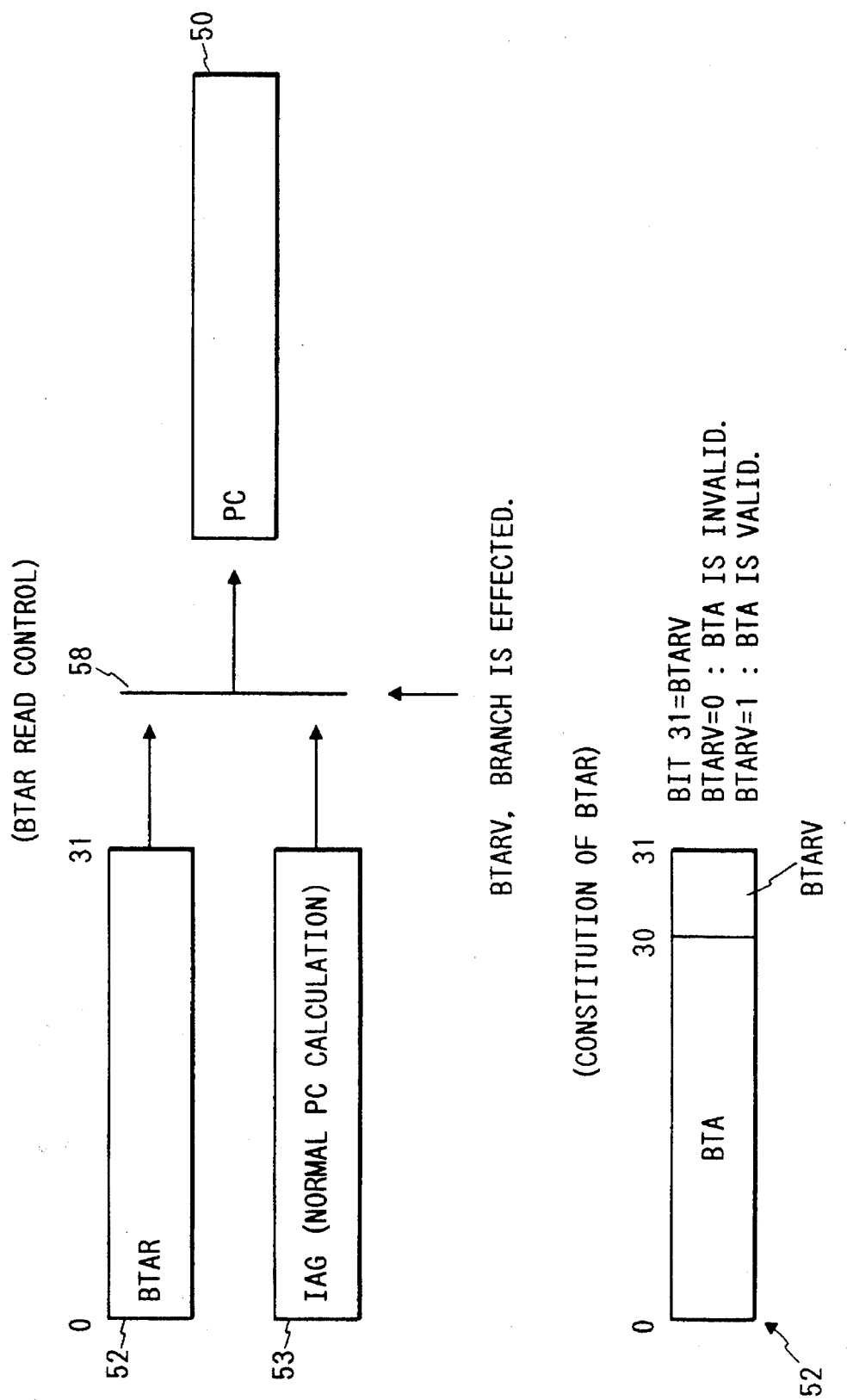
FIG. 7 is a diagram for illustrating a branch destination register and its read control technique.

For the function of "branch posting" shown in FIG. 4, a branch destination address register (BTAR) 52 is provided as shown in FIG. 5, and the output of an instruction address generating circuit (IAG) 53 and that of the branch destination address register (BTAR) 52 are selected and given to the program counter (PC) 50. That is, as shown in FIG. 7, the branch destination address register BTAR uses a 32-bit register, the area of the bits 0 to 30 is used as an area for storing a branch destination address BTA, the most significant bit of the bits 0 to 31 represents branch destination address register valid (BTARV): "0" of the bit BTARV represents that the area for storing the branch destination address BTA is invalid, and "1" of the bit BTARV represents that the area for storing the branch destination address BTA is valid. The instruction address generating circuit 53 generates an instruction address for the program counter PC, using a function except the branch posting function. The output of the branch destination address BTA held by the branch destination address register 52 to the program counter 50 is generated by a selector 58. The branch destination register valid (BTARV) and flag information representing that branch conditions are met are supplied to the selector 58 from the flag 61. By receiving flag information representing that BTARV is equal to 1 and branch conditions are met, a branch address sent from the branch destination address register 52 is supplied to the program counter 50 to execute a branch instruction.

The procedure for processing the NOP instruction having the branch posting function will be described below, referring to FIG. 6. When the bits 14 and 15 of the NOP instruction are 1 and 0, respectively, the branch destination address of the branch instruction to be next processed is calculated from the offset value and PC value (value of the program counter 50 at that time) of the NOP instruction to set the branch destination address in the branch destination address register (BTAR) 52, and the branch destination register valid (BTARV) is set to "1" (Step S2A). Then, the branch instruction is decoded in accordance with the instruction execution sequence (Step S2B). When the fact that branch conditions are met is reflected on the flag 61, the branch destination address is read from the branch destination address register BTAR when the branch instruction is executed. That is, when the BTARV is set to 1 and the branch conditions are met, the branch destination address BTA is read and set in the program counter 50. Thereafter, the branch destination register valid BTARV is reset (Step S2C). Thereby, processing is moved to the execution of an address instruction specified by the branch destination address BTA.

FIG. 8 shows a concrete example using the NOP instruction having the branch posting function. In FIG. 8, an example is shown in which conditions are compared by a CMP instruction, conditional branch to a label L0 is executed by a BCC instruction when the fact that conditions are met is obtained according to the comparison result, and thereafter conditions are compared by the CMP instruction and conditional branch to a label L1 is performed by the BCC instruction of (2) when the fact that conditions are met is obtained according to the comparison result. The condition branch instruction shown by BCC is a delay branch instruction, and a NOP instruction is set to a delay slot (1) immediately after the delay branch instruction. The NOP instruction of (1) is a NOP instruction having the branch posting function, in which the PC relative address of the branch destination address L1 of the BCC instruction of (2) is incorporated into an offset (incorporated in generating a code). The BCC instruction of (2) is the first branch instruction after the NOP instruction of (1). When the NOP instruction of (1) is executed, the operation of the branch destination address is performed by the arithmetic and logic unit (ALU) 36 according to the offset of the instruction, the address is set in the branch destination address register (BTAR) and the branch destination address register valid (BTARV) is set to "1". When the fact that branch conditions are met by the CMP instruction immediately before the BCC instruction of (2) is reflected on the flag 61, the branch destination address is read from the branch destination address register (BTAR) by an instruction decode stage ID of the BCC instruction of (2) because the branch destination address register valid (BTARV) is made valid. After the branch destination address is read, the branch destination address register valid (BTARV) is reset to "0". When the conditions are not met, the branch destination register valid (BTARV) is also reset.

Here, it is assumed that the pipeline structure of the microprocessor of this embodiment is a five-stage pipeline structure as shown in (A) and (B) of FIG. 8. In FIG. 8, symbol IF represents instruction fetch, ID represents instruction decode, EX represents instruction execution, OA represents operand access, and OS represents operand store. When the BCC instruction of (2) branches, at least three cycles (IF, ID, and EX) are required until a branch destination address is obtained through execution of the BCC instruction in the case of (A) where the branch destination address register (BTAR) is not used because the branch destination address is operated at the instruction execution stage EX. Contrarily in the case of (B), where the branch destination address register (BTAR) is used as described above, no branch destination address operation cycle is necessary and the branch destination address can be read from the register (BTAR) by the instruction decode stage ID. Therefore, only two cycles are required to obtain the branch destination address. That is, though in the case of (A) the branch destination address of the BCC instruction of (2) is calculated at the EX stage of the BCC instruction of (2), in the case of (B) it is calculated at the EX stage of the NOP instruction of (1) and the calculation result is stored in the branch destination register (BTAR). The condition branch instruction is one of the main causes of a pipeline hazard and reduction of its execution cycle greatly contributes to improvement of the performance of a data processor.

[6] Means for realizing function for register allocation posting

For the function of "register allocation posting" shown in FIG. 4, a return address hold register word (RAHW) 54, return address holding control register (RAHC) 55, and selector 59 are provided. The return address hold register word (RAHW) 54 indicates a register number for holding a return address from a subroutine. In this embodiment, it is assumed to divert sixteen general-purpose registers (the registers during a period not in use without parameter allocation) included in the register 35 to the use of holding a return address. As shown in FIG. 9, the return address hold register word (RAHW) 54 is divided into eight banks each of which consists of four bits so that eight registers can be registered, in other words, so as to enable the processing of up to eight nests. The return address holding control register (RAHC) 55 is a 32-bit register as shown in FIG. 9, in which the bit 0 represents a return address hold register valid RAHV, three bits of 21 to 23 a 3-bit counter (CNT), and eight bits of 24 to 31 the bank valid (BANKV) of each bank of the return address hold register word (RAHW) 54.

The outline of the processing procedure of the NOP instruction having the above register allocation posting function will be described below, referring to FIG. 6. When the bits 14 and 15 are set to 1 and 1, respectively, the register number shown in the offset of the NOP instruction are registered in the return address hold register word (RAHW) according to the result of the decoding by the instruction decoder 57, and the return address hold register valid (RAHV) is set (Step S3A). In this case, the register numbers are registered in the banks 0 to 7 of the return address hold register word RAHW in order. The register numbers registered in the banks 0 to 7 are different. Thereafter, for example, the branch subroutine (BSR) instruction processing (Step S3B) and the return-from-subroutine (RTS) instruction processing are executed.

Figure 10:
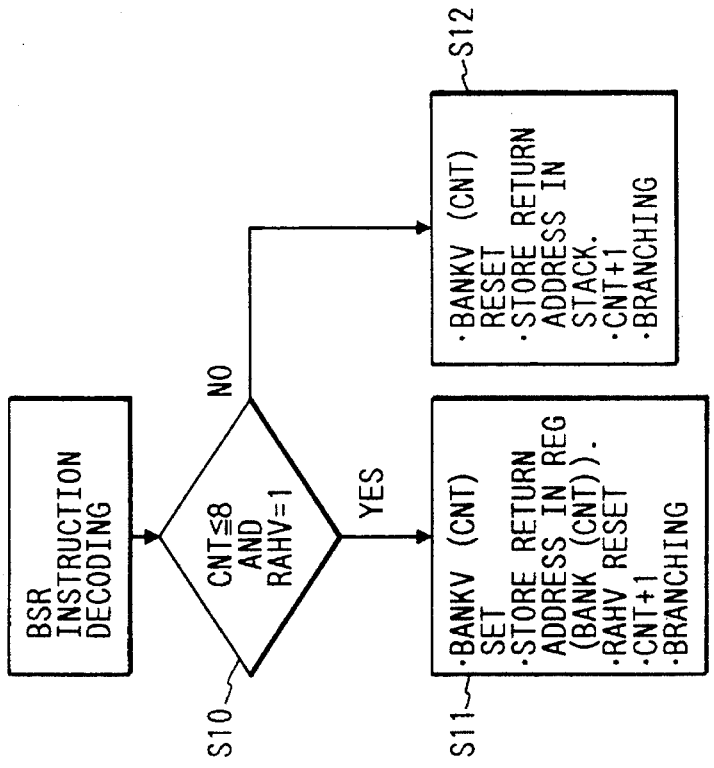
FIG. 10 is a flow chart of BSR instruction processing when using a NOP instruction having a register allocation posting function.

FIG. 10 shows an example of the above BSR instruction processing. After the BSR instruction is decoded, it is judged whether CNT is equal to or less than 8 and RAHV is equal to 1 (Step S10). That is, it is judged whether the general-purpose registers are used to store return addresses. The fact that RAHV is equal to 1 represents that there may be an empty register which can be used by the register allocation function by the previous NOP instruction. The fact that CNT is equal to or less than 8 represents that the nest level of a subroutine does not reach the upper limit and empty banks are present. When it is judged in Step S10 that CNT is equal to or less than 8 and RAHV is equal to 1, in Step S10, the program sets the bank valid BANKV indicated by the counter CNT to 1, stores the return address in the register of the number registered in the bank indicated by the counter CNT, increments the counter CNT by "1", and moreover resets RAHV and branches (Step S11). In other cases, the program stores the return address in the stack area of a memory, increments the counter CNT by "1", and branches (Step S12).

Figure 11:
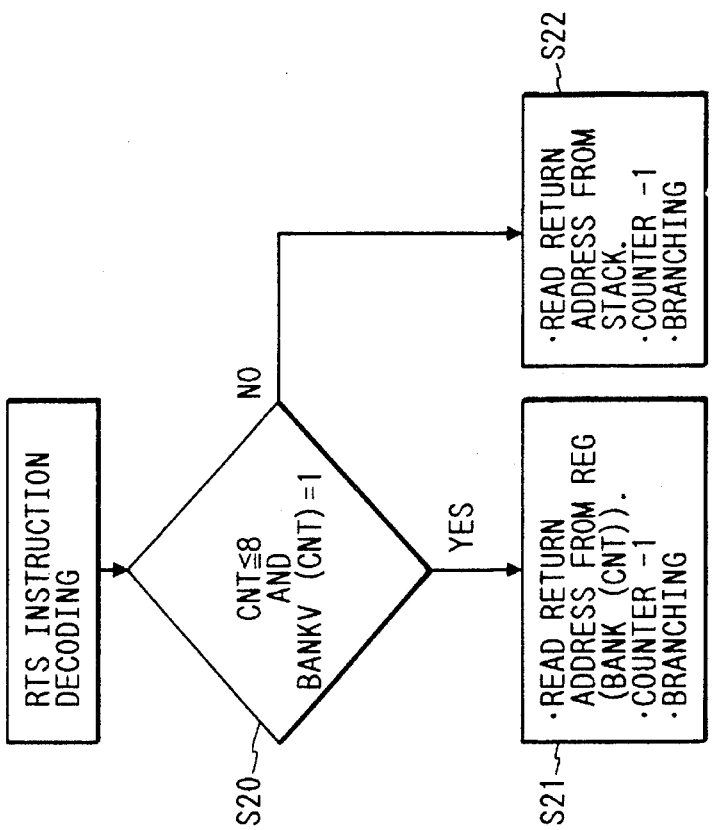
FIG. 11 is a flow chart of RTS instruction processing when using a NOP instruction having a register allocation posting function.

FIG. 11 shows an example of the RTS instruction processing. After the RTS instruction is decoded, it is judged whether CNT is equal to or less than 8 and BANKV indicated by the counter CNT is equal to 1 (Step S20). Judging whether BANKV indicated by the counter CNT is equal to 1 means judging the consistency with the nest level of the subroutine. When it is judged in the Step S20 that CNT is equal to or less than 8 and BANKV indicated by the counter CNT is equal to 1, the program reads the return address from the register registered in the bank indicated by the counter CNT, decrements the counter CNT by "1", and returns to the return address (Step S21). In other cases, the program reads the return address from the stack area, decrements the counter CNT by "1", and returns to the return address (step S22).

Thus, it is possible to increase the operation speeds of the BSR instruction and RTS instruction by posting a usable empty register instead of the stack area of a memory and using the register as the area for storing the return address for return after branch. That is, it is possible to write the return address or read the return address in case of return in or from the register instead of the memory, which takes a long time to access. Therefore, this contributes to improvement of the data processing speed.

[7] Means for realizing loop posting function

For the function of "loop posting" shown in FIG. 4, the cache control register (CCW) 62 is controlled by the NOP instruction having the function shown in FIG. 5. FIG. 12 shows an example of cache control register (CCW) 62, which has control bits for data cache enable DCE for enabling the operation of the data cache 38, instruction cache enable ICE for enabling the operation of the instruction cache 31, data cache lock ICL for inhibiting a new entry in the data cache 38, data cache clear DCC for clearing all entries in the data cache 38, and instruction cache clear ICC for clearing all entries in the instruction cache 31. Thereby, the operation modes of the data cache 38 and instruction cache 31 are controlled.

The processing procedure of the NOP instruction having the loop posting function will be described below, referring to FIG. 6. When the bits 14 and 15 are set to 0 and 1, respectively, it is indicated by an offset value whether an address into which the NOP instruction is inserted is present inside or outside a loop. When it is judged from the result of decoding the NOP instruction that the address is present outside the loop (offset=*1), the instruction cache lock ICL of the cache control register (CCW) 62 is reset as shown in Step S4A. Thereby, the instruction cache 31 can be updated after the NOP instruction. When contrarily it is judged that the address is present inside the loop, the instruction cache lock ICL of the cache control register (CCW) 62 is set and the data entered in the instruction cache 31** cannot be updated after the NOP instruction (however, data read is not inhibited). It is best to execute the indication that the address is present inside the loop in a position, for example, immediately before entering the loop and the indication that the address is present outside the loop in a position, for example, immediately after coming out of the loop. These positions are determined by the judgement of the loop by the compiler.

The loop posting function makes it possible to effectively use the instruction cache. That is, because replacement of entries of the instruction cache memory is inhibited, an instruction repeatedly executed at the loop part is always present in the instruction cache 31 during the execution. That is, by incorporating the loop part into the cache and thereafter incorporating the parts other than the loop part into it, it is inhibited that the instruction at the loop part is purged out of the instruction cache 31. Therefore, when the compiler recognizing the loop structure including control information for controlling incorporation of a cache into a NOP instruction, it is possible to effectively use a built-in cache with a limited memory capacity and decrease the frequency of access to an external memory which takes a long time to access. This contributes to improvement of the data processing speed.

The invention made by the inventor has been above described concretely with reference to an embodiment. However, the present invention is not restricted to the embodiment but it can variously be modified within the gist of it. For example, execution of an NOP instruction added with control information can be controlled not only by a hard wired logic instruction decoder or a microinstruction but by both of them. The control information added to the NOP instruction is not restricted to the above embodiment but it is possible to use other information.

The following is the brief description of advantages obtained from typical inventions among those disclosed in this application.

That is, because the compiler incorporates information for controlling the hardware of the data-processor, such as the positions of branch destinations of branch instructions and the used state of registers into object codes including no-operation instruction codes and posts the information to the data processor, it is possible to generate an object program whose execution efficiency is improved.

Because the data processor effectively uses its resource which is not practically used by the no-operation instruction code to reflect the hardware control information included in the object codes on the data processing, the data processing speed can be increased.

The function of posting the number of no operation cycles by the NOP instruction can facilitate the dealing with the architecture of a superpipeline with small pipeline pitches.

The function of posting branching by the NOP instruction makes it possible to fetch the instruction from the branch destination without wasting the time to obtain the result of calculation of the branch destination address of the branch instruction.

The function of posting the allocation of resisters by the NOP instruction makes it possible to use a register instead of the stack area on the memory to store the return address and omit comparatively-slow memory access in obtaining the return address for return. This contributes to improvement of the processing speed.

The function of posting the loop by the NOP instruction makes it possible to control inhibition of replacement of entires in the instruction cache for holding the instructions in a loop, effectively use the built-in cache with a limited memory capacity, and decrease the frequency of access to an external memory to which it takes a long time to access. This also contributes to improvement of the data processing speed.

What is claimed is:

1. A microcomputer for executing a program having a plurality of instructions including at least one no-operation instruction, comprising:

a decoder which decodes the instructions;

an execution unit which executes a predetermined operation in accordance with the result of the decoding by the decoder;

a program counter which stores the address of the instruction to be next executed; and a branch address register which stores the address of a branch destination;

wherein the no-operation instruction has a field for storing data for the branch destination address of a branch instruction issued after the no-operation instruction, the execution unit executes an operation corresponding to an address of the branch destination of the branch instruction using the data stored in the field of the no-operation instruction, and the result of the operation executed by the execution unit is stored in the branch address register as the address of the branch destination of the branch instruction.

2. The microcomputer according to claim 1, further including:

an address register for storing an instruction address other than the branch destination address; and a selector for supplying one of the branch destination address in the branch address register and the address in the address register to the program counter.

3. The microcomputer according to claim 2, further including:

a control unit including a flag set when a predetermined condition is met by executing a predetermined instruction among the instructions.

4. The microcomputer according to claim 3, wherein the branch address register has information for showing whether the branch destination address stored in the branch address register is valid.

5. The microcomputer according to claim 4, wherein the selector supplies the branch destination address stored in the branch address register to the program counter when the flag is set and the information shows that the branch destination address stored in the branch address register is valid.

6. A microcomputer for executing a program having a plurality of instructions including at least one no-operation instruction, comprising:

a decoder which decodes the instructions;

an execution unit which executes a predetermined operation in accordance with the result of the decoding by the decoder; and a plurality of registers for storing predetermined data; wherein the no-operation instruction has a field for storing a number identifying a predetermined register available to store the return destination address of a subroutine, and the return destination address of the subroutine is stored in the predetermined register as the result of decoding the field of the no-operation instruction by the decoder.

7. The microcomputer according to claim 6, further comprising:

a number specifying register coupled to the plurality of registers, wherein the number specifying register has an area for specifying the number of the predetermined register.

8. The microcomputer according to claim 7, wherein the number specifying register has a plurality of areas for specifying a plurality of predetermined registers.

9. The microcomputer according to claim 8, further comprising a control register having an area for showing the number of predetermined registers specified by the number specifying register.

10. The microcomputer according to claim 9, wherein the control register stores information for showing whether a register number stored in each area of the number specifying register is valid.

11. A microcomputer for executing a program having a plurality of instructions including at least one no-operation instruction, comprising:

a decoder which decodes the instructions;

an execution unit which executes a predetermined operation in accordance with the result of the decoding by the decoder;

a cache memory which stores the instructions; and a cache control register having information for showing whether replacement of the instructions stored in the instruction cache memory is inhibited;

wherein the no-operation instruction has a field for storing information for showing whether the no-operation instruction is present in a loop, and in response to decoding of the no-operation instruction by the decoder, information for inhibiting the replacement of the instructions stored in the cache memory is set in the cache control register in order to inhibit the replacement of the instructions if information showing that the no-operation instruction is present in the loop is stored in the field of the no-operation instruction.

12. In a computing apparatus, a method comprising the steps of:

generating an object program, wherein the object program comprises a plurality of instructions, wherein the plurality of instructions comprise at least one no-operation instruction comprising one or more fields, wherein the one or more fields of the no-operation instruction contain control information;

storing the object program in a memory;

retrieving the instructions of the object program from the memory;

decoding the instructions of the object program;

executing the instructions of the object program;

wherein, responsive to the decoding of the no-operation instruction, the execution of the instructions is responsive to the control information of the one or more fields of the no-operation instruction.

13. The method as claimed in claim 12, wherein the control information comprises branch destination information for a branch instruction of the object program.

14. The method as claimed in claim 12, wherein the control information comprises information identifying a register for storing the return address of a subroutine of the object program.

15. The method as claimed in claim 12, wherein the control information comprises information inhibiting replacement of instructions in a cache memory of the computing apparatus if the no-operation instruction is present in a loop of the object program.

* * * * *